United States Patent [19]

Mizusaki

[11] 4,376,490
[45] Mar. 15, 1983

[54] OBSERVING WINDOW DEVICE FOR LIQUID TANKS

[75] Inventor: Yoshinobu Mizusaki, Ueda, Japan

[73] Assignee: Nissin Kogyo Kabushiki Kaisha, Nagano, Japan

[21] Appl. No.: 202,464

[22] Filed: Oct. 31, 1980

[30] Foreign Application Priority Data

Nov. 10, 1979 [JP] Japan ............................. 54-156045[U]
Nov. 19, 1979 [JP] Japan ............................. 54-160043[U]
Dec. 19, 1979 [JP] Japan ............................. 54-176036[U]
Mar. 18, 1980 [JP] Japan ............................. 55-35584[U]

[51] Int. Cl.³ ..................... B65D 25/54; B65D 25/56; G01F 23/02
[52] U.S. Cl. .................................. 220/82 R; 73/323; 116/227; 411/516; 220/82 A
[58] Field of Search ................. 220/82 R, 82 A, 82.5, 220/377; 60/537; 116/227; 73/323; 411/516, 517, 518

[56] References Cited

U.S. PATENT DOCUMENTS

| | | | |
|---|---|---|---|
| 1,644,298 | 10/1927 | Ledbetter | 411/516 |
| 2,405,476 | 8/1946 | Weatherhead | 411/516 |
| 3,000,345 | 9/1961 | Gray | 73/323 |
| 3,248,946 | 5/1966 | Cochtenberg | 220/82 R |
| 3,340,760 | 9/1967 | Wormser | 411/517 |
| 3,667,645 | 6/1972 | Emmer | 220/82.5 |

FOREIGN PATENT DOCUMENTS 1437487 3/1966 France ........................... 73/323

*Primary Examiner*—George E. Lowrance
*Attorney, Agent, or Firm*—Posnack, Roberts, Cohen & Spiecens

[57] ABSTRACT

A flanged cup-shaped transparent pane member is fitted in a window opening formed in the tank wall and held liquid-tight against the latter by means of a pane retainer plate which is inserted along the wall inside into the pane member through slit means provided therein. The retainer plate fully inserted abuts against a shoulder formation on the wall inside and serves to hold the pane member against inadvertent rotation as well as against falling off the tank wall. That portion of the retainer plate which extends across the follow interior of the cup-shaped pane member serves as a light reflector means for enabling the user to observe the liquid level in the tank with ease and accuracy. A minimum level indicator is formed on the closed end wall of the pane member and a maximum level indicator on the retainer plate at its top for convenience in replenishing the liquid tank.

10 Claims, 15 Drawing Figures

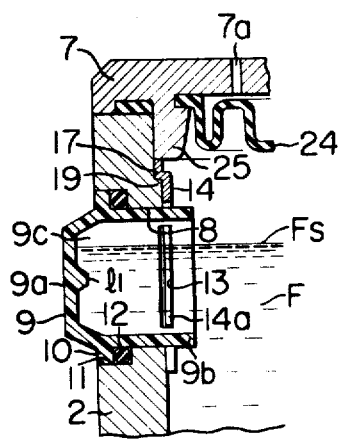
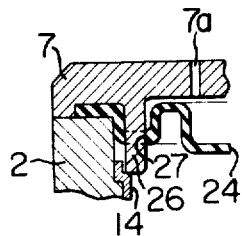
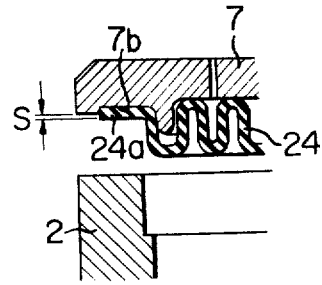
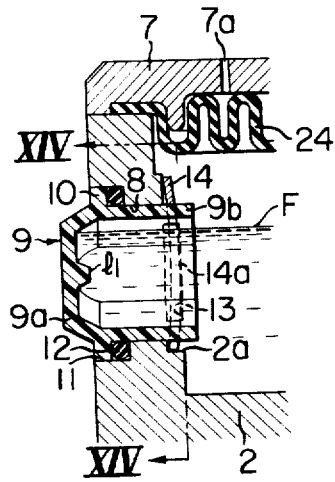
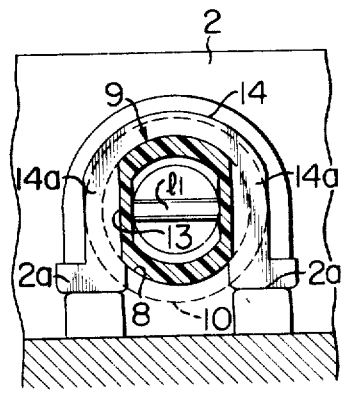
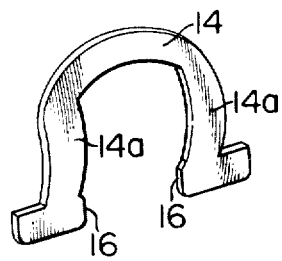

OBSERVING WINDOW DEVICE FOR LIQUID TANKS

BACKGROUND AND SUMMARY OF THE INVENTION

This invention relates generally to liquid tanks such as brake master cylinder reservoirs and more particularly to observing window devices usable on such tanks for visual confirmation of the liquid level in the tank from the outside thereof.

The present invention has for its object the provision of a novel observing window device of the kind concerned which is so designed that the transparent pane member thereof can be readily installed in a window opening formed in one of the side walls of a liquid tank in a leak-tight fashion and in such a manner as to be securely held against removal or dislocation by tampering from the tank outside.

Another object of the present invention is to provide an observing window device of the character described which is particularly simple in construction and enables level confirmation with ease and accuracy, including a combined light reflector and panel retainer plate arranged inside the liquid tank so as to securly hold the transparent pane member of the device in place in the window opening.

A further object of the present invention is to provide an observing window device of the character described which is of simple construction and in which the cover plate member of the liquid tank is utilized to firmly secure the transparent pane member in place in the window opening so as not to fall off the tank wall or be dislocated therein to allow fluid leakage even under severe vibration.

Yet another object of the present invention is to provide an observing window device of the character described in which the pane retainer plate is designed also to serve as a level indicator means for indicating the upper limit level of liquid in the liquid tank for convenience in replenishing the latter while serving as means for holding the pane member against rotation to keep a level mark thereon in its specified position.

These and other objects, features and advantages of the present invention will become apparent from the following description when taken in conjunction with the accompanying drawings.

BRIEF DESCRIPTION OF THE DRAWINGS

In the drawings, which illustrate a few preferred embodiments of the present invention:

FIG. 10 is a view similar to FIGS. 2 and 8, illustrating a further preferred embodiment of the present invention;

FIG. 11 is a fragmentary cross-sectional view, illustrating a modification of the embodiment shown in FIG. 10; and FIGS. 12 to 15 illustrate yet another preferred embodiment of the present invention; FIG. 12 representing a view similar to FIGS. 2, 8 and 10 of the further preferred embodiment; FIG. 13 representing a fragmentary cross section, in an exploded form, of the further preferred embodiment; FIG. 14 representing a cross section taken along line XIV—XIV in FIG. 12; and FIG. 15, an oblique view of the pane retainer plate shown in FIGS. 12 and 14.

DESCRIPTION OF THE PREFERRED EMBODIMENTS

The present invention will next be described with reference to the accompanying drawings, which illustrate preferred embodiments of the invention as applied to brake master cylinder reservoirs for motorcycle use.

Figure 1:
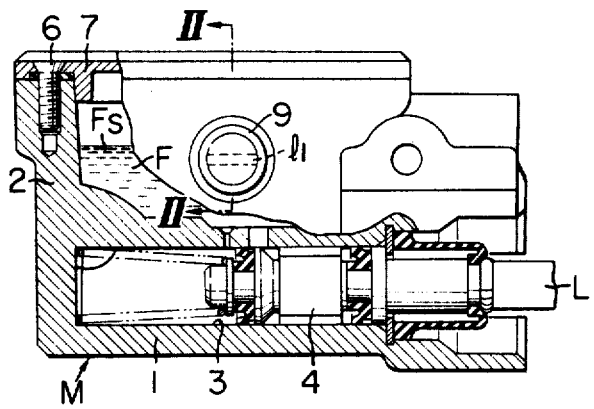
FIG. 1 is a front view, partly cut away and in section, of a brake master cylinder reservoir embodying the present invention.
Figure 3:
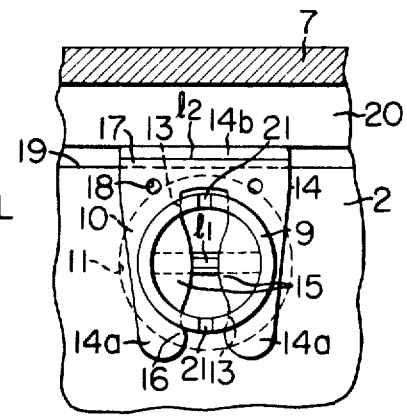
FIGS. 3 and 4 are fragmentary cross-sectional views taken along lines III—III and IV—IV, respectively, in FIG. 2.

Referring first to FIG. 1, reference character M generally indicates a brake master cylinder with integral oil reservoir, which is mounted on the steering handle of a motorcycle (not shown). The cylinder body 1 and the reservoir 2 disposed at the top thereof in the form of a liquid tank together constitute an integral structure cast of light metal such as an aluminum alloy. Slidably fitted in the cylinder bore 3 formed in the cylinder section 1 of the structure is a piston 4 which is actuated by a brake lever L operatively connected thereto. Stored in the reservoir 2 is a supply of brake oil F which is to be fed into the oil chamber defined in the cylinder bore 3. The oil reservoir 2 is open-topped and is normally closed by a cover plate 7 which is secured thereto by means of bolts 6, as shown.

Figure 2:
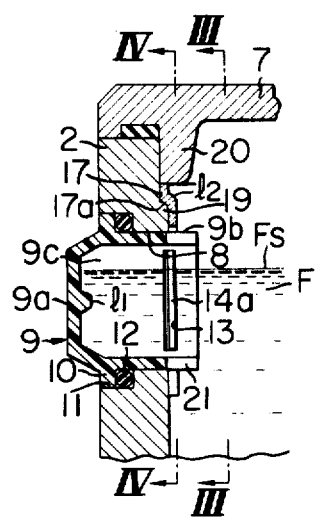
FIG. 2 is a fragmentary cross-sectional view, on an enlarged scale, taken along line II—II in FIG. 1.

That side wall of the reservoir tank 2 which faces toward the driver of the motorcycle is formed therein with a circular-shaped window opening 8. As shown in FIG. 2, a generally cup-shaped transparent pane member 9 formed of a highly chemical-resistant synthetic resin material such as nylon 6, polypropylene or polyethylene, is fitted in the window opening 8 with its closed end wall 9a facing outwardly thereof. Formed on the inside of the closed end wall 9a is a horizontally extending projection or ridge $l_1$ which serves as a means for indicating the lower limit level of liquid in the tank 2. An abutment flange 10 is formed around the outer periphery of the cup-shaped transparent pane member 9 integrally therewith while an annular recess 11 is formed in the adjacent side wall of reservoir 2 on the outside thereof around the window opening 8. As shown in the drawing, the abutment flange 10 is fitted in the annular recess 11 in abutting relation to the annular bottom thereof with a sealing ring 12 interposed therebetween and serves to determine the axial position of the transparent pane menber 9 in the window opening 8. As will be readily understood, the sealing ring 12 serves to prevent leakage of oil F through the clearance between the pane member 9 and the peripheral wall of window opening 8, in which the pane member 9 is fitted.

Further, the cup-shaped pane member 9 is formed in its opposite side walls adjacent to the inner, open end 9b of the pane member with a pair of slits 13 in which a pane retainer plate 14 is fitted in the manner described below to prevent the pane member 9 from falling off the tank wall.

Figure 4:
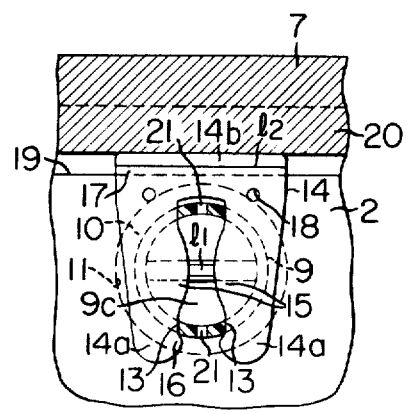
Figure 5:
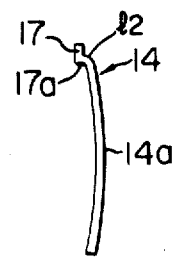
FIG. 5 is a side view of the pane retainer plate shown in FIGS. 2 to 4.

Specifically, the pane retainer plate 14 is formed of a highly light-reflecting and resilient material such as stainless or spring steel and is generally portal-shaped, consisting of a pair of spaced opposite grip legs 14a and a bridge portion 14b extending therebetween, as seen in FIG. 4. The two leg portions 14a are curved in their free state in a vertical plane normal thereto, as shown in FIG. 5, and formed along the middle and bottom regions of the opposing inside edges thereof with lugs 15 and 16, respectively, as seen in FIG. 4. The bridge portion 14b is bent along its top edge to form a horizontal shoulder portion 17 and is also formed with a pair of spaced tool-receiving holes 18. The top surface $l_2$ of the horizontal shoulder portion 17 serves as a level indicator surface for defining the upper limit level of oil F in the reservoir tank 2 while the bottom surface 17a of shoulder portion 17 serves as a positioning surface to be placed in engagement with a horizontal shoulder 19 formed on the inside of the adjacent tank wall, as seen in FIG. 2. As the pane retainer plate 14 is fitted along the wall inside downwardly over the cup-shaped pane member 9, the grip legs 14a are forcibly inserted through the side slits 13 in the pane member 9 and, under their own resiliency, act to urge the latter inwardly of the reservoir tank 2 so that the abutment flange 10 of pane member 9 is tightly pressed against the sealing ring 12. Simultaneously with this, the positioning surface 17a of the bridge portion 14b of pane retainer plate 14 is brought into engagement with the horizontal shoulder 19 formed inside the top portion of reservoir tank 2, to hold the retainer plate 14 and hence the pane member 9 in a predetermined angular position. The lugs 15, 16 formed on the legs 14a of retainer plate 14 serve the purpose of preventing the latter from being inadvertently drawn out of the side slits 13 of pane member 9.

In order to further ensure that the retainer legs 14a are prevented from being inadvertently drawn out of the side slits 13, the cover plate 7 has a projection 20 downwardly extending therefrom so as to abut against the top edge of the bridge portion 14b of retainer plate 14 when the cover plate 7 is fixed to the reservoir tank 2, as illustrated.

The inner, open-end portion 9b of the cup-shaped transparent pane member 9 is slotted at the top and bottom thereof, as indicated by numeral 21, in order to facilitate the flow of oil F into and out of the hollow interior 9c of the pane member 9.

Now, assuming that the oil surface Fs in the reservoir tank 2 is at a level midway of the height of the hollow space 9c in the cup-shaped transparent pane member 9, exterior light entering through the closed end wall 9a thereof into the upper half of hollow space 9c above the oil level Fs is reflected by the outer surfaces of grip legs 14a while light entering into the lower half of the hollow space 9c below the oil level Fs is mostly absorbed in the oil F, thus enabling the driver to clearly observe through the transparent pane member 9 the boundary line between the light-reflecting portion of each of the grip legs 14a and that portion thereof lying below the oil level Fs thereby to check the amount of oil F held in the reservoir tank 2. In the illustrated embodiment, the lugs 15 formed on the respective grip legs 14a and lying in the hollow space 9c result in increase in light-reflecting area of the grip legs and the effectiveness of the combined pane retainer and reflector plate 14 is further enhanced.

In the event that the amount of oil F stored in the reservoir tank 2 has decreased to such an extent that the oil level Fs lies below the lower limit level indicator ridge $l_1$ on the pane member 9, the cover plate 7 is removed and the reservoir tank 2 is replenished with oil while looking down into the interior thereof until it is confirmed that the oil level Fs has risen to the top surface of the bent portion 17 of pane retainer plate 14, which indicates the upper limit level $l_2$ to which oil is to be replenished.

Figure 6:
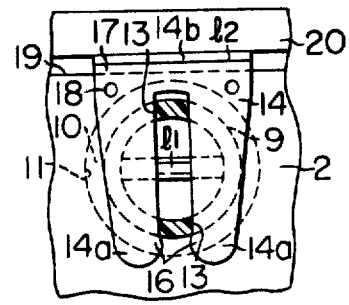
FIG. 6 is a view similar to FIG. 4, illustrating a modified form of pane retainer plate.

FIG. 6 illustrates another embodiment of the present invention which is substantially the same as that described above except that it includes a modified form of pane retainer plate 14 which has a pair of grip legs 14a whose opposing inside edges extend straight downward substantially over the whole length thereof and that the cup-shaped transparent pane member 9 is not slotted at the inner, open end nor in its top or bottom wall.

Figure 7:
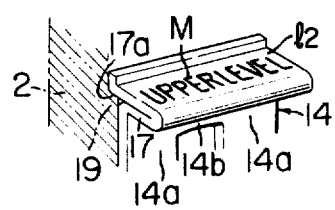
FIG. 7 is a fragmentary oblique view illustrating another modification of the pane retainer plate.

FIG. 7 illustrates another modified form of pane retainer plate 14 which has its top portion doubly bent into a T-shaped section the leg portion of which continues to the grip legs 14a of retainer plate 14 and the cross bar of the "T" is inscribed on its top horizontal surface $l_2$ with a level mark "UPPER LEVEL" to materially enhance the effectiveness of the surface $l_2$ as an indication of the upper limit level to which oil is to be replenished.

Figure 8:
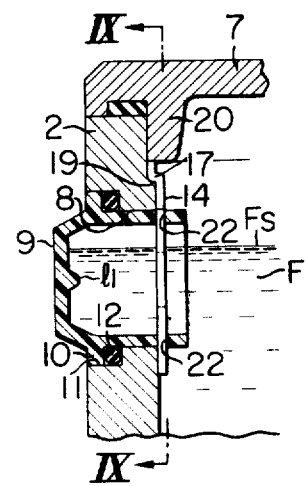
FIG. 8 is a view similar to FIG. 2, illustrating another preferred embodiment of the present invention.
Figure 9:
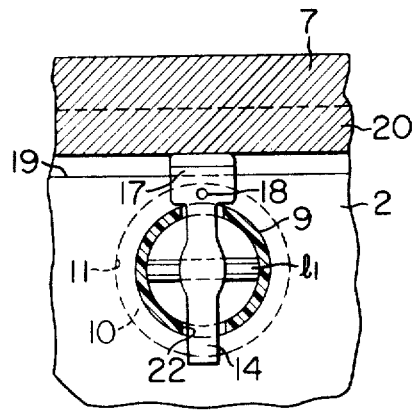
FIG. 9 is a cross section taken along line IX—IX in FIG. 8.

FIGS. 8 and 9 illustrate another preferred embodiment of the present invention, which is substantially similar to the embodiment shown in FIGS. 1 to 5 except that the transparent pane member 9 is formed in its open-end portion 9b at the top and bottom thereof with through openings 22 instead of the slits 13 formed in the previous embodiment and that a pane retainer plate 14 in the form of a vertically extending strip is fitted into the through openings 22 across the hollow portion 9c of pane member 9. In these figures, like parts are identified by the same reference numerals as in FIGS. 1 to 5.

Yet another preferred embodiment of the present invention is shown in FIG. 10, wherein again like parts are identified by the same reference numerals as in FIGS. 1 to 5 and FIGS. 8 and 9. Provided in this embodiment is a cover plate 7 which is formed therein with a vent hole 7a and has a diaphragm 24 arranged on the underside thereof so as not to allow any atmospheric air flowing in through the vent hole 7a to come into contact with the oil F held in the reservoir tank 2. Obviously, the diaphragm 24 is flexible to allow rise or fall of the oil level Fs in the reservoir tank. As in the embodiments previously described, the cover plate 7 has a projection 25 extending downwardly therefrom which abuts against or lies closely opposite to the top edge of the pane retainer plate 14 when the cover plate 7 is fitted to close the reservoir tank 2, thus to prevent the retainer plate 14 from upwardly slipping out of the pane member 9. In cases where the pane retainer plate 14 has a horizontally extending top edge as in this and other embodiments previously described, the projection 25 serves also to hold the retainer plate 14 against rotation. This holds as well where the opposing edges of projection 25 and retainer plate 14 are placed in interfitting relation to each other with projections and recesses complementarily formed thereon. This embodiment is otherwise similar in construction as well as in functional effects to the one shown in FIGS. 1 to 5.

FIG. 11 illustrates a further embodiment of the present invention in which a diaphragm 24 is clamped between the cover plate 7 and the top of reservoir tank 2 as in the embodiment of FIG. 10. In this embodiment, however, the downward projection 26 formed on the bottom of cover plate 7 and effective to prevent the pane retainer plate 14 from slipping off the transparent pane member 9 is fitted through a through opening 27 formed in the diaphragm 24 in an air-tight fashion. This arrangement not only enables the diaphragm 24 to be mounted securely with ease but enables the projection 26 to restrain the retainer plate 14 without the danger of the diaphragm 24 standing therebetween.

FIGS. 12, 13 and 14 illustrate another preferred embodiment of the present invention in which the cover plate 7 is fixed to the open top of reservoir tank 2 by clamping bolt means (not shown) so that the peripheral edge portion 24a of diaphragm 24 is tightly clamped between the top end face of reservoir tank 2 and the adjacent peripheral portion of cover plate 7. It will be apparent that the diaphragm 24 so arranged serves to prevent any external air flowing in through a vent hole 7a formed in the cover plate 7 from coming into contact with oil F held in the reservoir tank 2 and is flexible to allow rise or fall of the oil level Fs therein.

The peripheral edge portion 24a of diaphragm 24, serving as a static seal between the cover plate 7 and reservoir tank 2, is secured to the cover plate 7 in advance, as seen in FIG. 13, in fitting relation to an annular recess 7b formed in the bottom surface of the cover plate. When the cover plate 7 is fixed to the reservoir tank 2, the sealing edge portion 24a is compressed at most by an amount of interference s and is never deformed in excess however large a force may be applied to the clamping bolts (not shown). This enables substantial increase in service life of the diaphragm 24.

Also, the pane retainer plate 14 is formed of a highly resilient material, e.g. a spring steel and, as clearly seen in FIGS. 14 and 15, includes a pair of spaced parallel grip legs 14a which are arcuately curved in a vertical plane normal thereto and formed at the bottom end with detent lugs 16, extending laterally toward each other.

When the retainer plate 14 is mounted on the cup-shaped transparent pane member 9 along the inside wall surface of reservoir tank 2, the two grip legs 14a are forcibly slid down into the respective slits 13 formed in the side walls of the pane member 9 so as to urge the latter inwardly of the reservoir tank 2 under their own resiliency thereby to hold the annular abutment flange 10 of pane member 9 pressed against the sealing ring 12. The detent lugs 16 on respective grip legs 14a, having passed through the slits 13, are released therefrom to resiliently engage the bottom surface of the pane member 9. In this manner, the retainer plate 9 is securely held in engagement with the pane number 9 and effectively prevents the latter from inadvertently slipping out of the window opening 8.

As shown in FIGS. 12 and 14, horizontal positioning shoulders 2a are formed on the inside of the reservoir tank 2 for abutting engagement with the bottom edges of grip legs 14a of retainer plate 14. The shoulders 2a serve to hold the pane member 9 in its predetermined angular position through the intermediary of the retainer plate 14 thereby to hold the lower limit level indicator ridge $l_1$ on the end wall 9a of pane member 9 in its horizontal position.

This embodiment is otherwise similar in construction and functional effects to the one shown in FIGS. 1 to 5 and the same reference numerals have been retained for similar parts which have the same functions.

The formation of such positioning shoulders 2a makes it possible to hold the cup-shaped transparent pane member 9 in place without necessitating the provision of any rotation-restraining projection on the pane member 9 or the pane retainer plate 14. Specifically, the absence of any rotation-restraining projection on the retainer plate 14 not only simplifies its structure but is highly desirable from the viewpoint of preventing any damage to the diaphragm 24, which serves to close the open top of reservoir tank 2. The pane member 9, with no rotation-restraining projection formed thereon along its outer periphery, is particularly advantageous for liquid-tight fitting engagement with the window opening 8 in the adjacent tank wall.

To summarize, according to the present invention, a cup-shaped transparent pane member formed with an abutment flange around the outer periphery thereof is fitted in an opening formed through a side wall of a liquid tank with the closed end of the pane member outwardly directed and a pane retainer plate of resilient material is fitted along the inside surface of the adjacent tank wall into engagement with the open end portion of the pane member extending into the liquid tank so as to urge the pane member inwardly thereof so that the abutment flange of the pane member is tightly held against the outside surface of the tank wall. In this manner, the transparent pane member can be securely held in a predetermined position by means of a single piece of retainer plate, and the mounting operation of such pane member be effected with extreme ease. The provision of the retainer plate inside the liquid tank makes it impossible to remove the pane member as long as the tank is held closed and the danger of the pane member being removed by tampering from the tank outside is obviated, rendering the device particularly reliable. Further, owing to the resiliency of the pane retainer plate, the seal member arranged between the flanged end portion of the pane member and the adjacent tank wall is at all times held under a sealing pressure enough to keep the window device liquid-tight so that there is no danger of fluid leakage from the tank even under vibration. In addition, the pane retainer plate held inside the liquid tank in resilient engagement with the cup-shaped transparent pane member and extending across the hollow interior of the latter serves the dual function as means for preventing the pane member from falling off the tank wall and as light reflecting means arranged inside the tank wall. This enables the window device to be fabricated with a minimum number of parts required and at reduced cost while enabling the user to visually confirm the liquid level in the tank with particular ease and accuracy through the window device.

According to a further feature of the present invention, the pane retainer plate is shouldered for engagement with a corresponding shoulder formation on the inside of the adjacent tank wall so that the retainer plate and hence the transparent pane member fitted therewith are effectively held against rotation relative to the liquid tank.

Further, the cover plate of the liquid tank, being formed to abut against the top of the pane retainer plate, serves an additional function of preventing the latter from slidding off the transparent pane member. With this arrangement, it will be recognized that the pane retainer plate can be securely held in place without necessitating any particular member therefore even if subjected to severe vibration and that there is no danger of fluid leakage as occurring when the pane member falls off of itself from the tank wall. Further advantages of this arrangement include reduction in number of parts required, simplicity of construction and ease of assembling.

Further, the pane retainer plate, including a level formation to indicate the upper limit level of liquid in the liquid tank, serves for convenience in replenishing the latter, without necessitating any separate indicator plate.

What is claimed is:

1. An observation window device for a liquid tank having a window opening formed in a side wall thereof, said window device comprising a generally cup-shaped transparent pane member including a side wall having an outer periphery with an abutment flange therearound, said side wall of the cup-shaped member being provided with slit means, said pane member having an open end extending into the interior of said liquid tank and including an integral lower limit level indicating portion for defining the lowest level of liquid in said liquid tank, pane retainer plate means engaged in said slit means and held in abutting engagement with an inside surface of said side wall of said liquid tank for resiliently urging said pane member inwardly of said liquid tank to place said abutment flange in fluid-tight contact with an outside surface of said side wall of said liquid tank and rotation-restraining means integrally formed with said pane retainer plate means for holding said pane member and said pane retainer plate means in place against rotation thereof relative to said liquid tank, said slit means including a pair of slits in opposition in said side wall of said cup-shaped pane member, said pane retainer plate means comprising a retainer plate including a pair of spaced, parallel grip legs respectively in fitting engagement in said slits and a bridge portion interconnecting said grip legs at the top thereof, said tank having a removable cover member, said bridge portion of said pane retainer plate being held in abutting engagement with said cover member so that said retainer plate is prevented from inadvertent disengagement from said pane member.

2. An observing window device as claimed in claim 1 in which said rotation-restraining means includes a first shoulder on the inside of said side wall of said liquid tank and a second shoulder on said pane retainer plate for engagement with said first shoulder.

3. An observing window device as claimed in claim 1 in which said rotation-restraining means includes a positioning shoulder on the inside of said side wall of said liquid tank and engageable with said two grip legs of said pane retainer plate at end thereof.

4. An observing window device as claimed in claim 1 in which said pane retainer plate includes level indicator means thereon for defining the upper limit of liquid level in said liquid tank.

5. An observing window device as claimed in claim 4 in which said level indicator means include a top surface of a horizontal bent portion of said pane retainer plate which is held in engagement with a horizontal shoulder formed on the inside surface of said side wall of said liquid tank.

6. An observing window device as claimed in claim 1 in which said grip legs of said pane retainer plate have ends with detent pawls protruding therefrom toward one another engaged with said cup-shaped transparent pane member so that said pane retainer plate is additionally held against inadvertent disengagement from said pane member.

7. An observing window device as claimed in claim 1 or 6 in which said grip legs of said pane retainer plate include lateral projections extending therefrom toward one another into the hollow interior of said cup-shaped transparent pane member.

8. An observing window device as claimed in claim 1 wherein said pane member includes a front wall, said lower limit level indicating portion being on said front wall.

9. An observing window device as claimed in claim 1 wherein said pane retainer plate is made of resilient material and is engaged under stress in said slit means and against said side wall of said tank.

10. An observing window device as claimed in claim 1 wherein said slit means, said pane retainer plate means and said rotation-restraining means are operatively oriented to position said lower limit level indicating portion in a horizontal attitude across said cup-shaped pane member.

* * * * *